United States Patent
Jensen

(10) Patent No.: US 8,123,948 B2
(45) Date of Patent: Feb. 28, 2012

(54) BIOMIMETIC WATER MEMBRANE COMPRISING AQUAPORINS USED IN THE PRODUCTION OF SALINITY POWER

(75) Inventor: Peter Holme Jensen, Copenhagen Ø (DK)

(73) Assignee: Aquaporin A/S, Copenhagen (DK)

( * ) Notice: Subject to any disclaimer, the term of this patent is extended or adjusted under 35 U.S.C. 154(b) by 0 days.

(21) Appl. No.: 12/067,448

(22) PCT Filed: Sep. 20, 2006

(86) PCT No.: PCT/DK2006/000520
§ 371 (c)(1),
(2), (4) Date: Sep. 10, 2008

(87) PCT Pub. No.: WO2007/033675
PCT Pub. Date: Mar. 29, 2007

(65) Prior Publication Data
US 2009/0007555 A1    Jan. 8, 2009

Related U.S. Application Data

(60) Provisional application No. 60/719,890, filed on Sep. 20, 2005.

(30) Foreign Application Priority Data

Sep. 20, 2005 (DK) ............................... 2005 01309
May 19, 2006 (WO) ................ PCT/DK2006/000278

(51) Int. Cl.
*B01D 65/00* (2006.01)
(52) U.S. Cl. ... 210/652; 210/637; 210/650; 210/321.66; 210/321.65; 210/170.11; 290/54

(58) Field of Classification Search ............. 210/500.35, 210/500.36, 500.42, 641, 321.75, 257.2, 210/500.2, 7, 490, 170.11, 321.6, 321.65–321.66, 210/321.88, 321.89, 637, 650, 652, 137, 210/653; 435/17.1, 4; 436/524, 172, 82.05; 530/402; 425/450, 1.21, 9, 32, 417, 489; 264/4.1, 4.3, 4.6, 41; 290/43, 54; 60/326, 60/649
See application file for complete search history.

(56) References Cited

U.S. PATENT DOCUMENTS 3,906,250 A * 9/1975 Loeb ............................ 290/1 R
(Continued)

FOREIGN PATENT DOCUMENTS

DK    PA 2005 00740    5/2005
(Continued)

OTHER PUBLICATIONS

Agre et al., "The Aquaporins, Blueprints for Cellular Plumbing Systems," *J. Biol. Chem.* 273:14659-14662 (1998).
(Continued)

*Primary Examiner* — Tony G Soohoo
*Assistant Examiner* — David C Mellon
(74) *Attorney, Agent, or Firm* — Kristina Bieker-Brady; Clark & Elbing LLP

(57) ABSTRACT

The present invention provides methods for producing salinity power using pressure retarded osmosis and a biometric membrane (e.g., a liquid bilayer membrane or a lipid membrane containing multiple bilayers of fused deposited lipid vesicles) containing aquaporin water channels. The invention also provides power plants for producing salinity energy using pressure retarded osmosis and a biometric water membrane containing functional aquaporin channels.

12 Claims, 5 Drawing Sheets

U.S. PATENT DOCUMENTS

| | | | | |
|---|---|---|---|---|
| 4,193,267 | A * | 3/1980 | Loeb | 60/649 |
| 4,966,708 | A * | 10/1990 | Oklejas et al. | 210/637 |
| 7,563,370 | B2 * | 7/2009 | Thorsen et al. | 210/321.65 |
| 7,566,402 | B2 * | 7/2009 | Thorsen et al. | 210/652 |
| 2003/0102263 | A1 * | 6/2003 | Lopez et al. | 210/639 |
| 2004/0049230 | A1 | 3/2004 | Montemagno et al. | |
| 2005/0016924 | A1 * | 1/2005 | DeVoe | 210/644 |
| 2009/0120874 | A1 * | 5/2009 | Jensen et al. | 210/638 |
| 2010/0183903 | A1 * | 7/2010 | McGinnis et al. | 429/50 |
| 2010/0270233 | A1 * | 10/2010 | Kim et al. | 210/490 |

FOREIGN PATENT DOCUMENTS

| | | |
|---|---|---|
| WO | WO02/13955 | 2/2002 |
| WO | WO 2006/122566 | 11/2006 |

OTHER PUBLICATIONS

Borgnia et al., "Cellular and Molecular Biology of the Aquaporin Water Channels," *Annu. Rev. Biochem.* 68:425-458 (1999).
Brian et al., "Allogeneic Stimulation of Cytotoxic T Cells by Supported Planar Membranes," *Proc. Natl. Acad. Sci. U.S.A.* 81:6159-6163 (1984).
U.S. Appl. No. 60/683,466, filed May 20, 2005, Jensen et al.
Burykin et al., "What Really Prevents Proton Transport through Aquaporin? Charge Self-Energy Versus Proton Wire Proposals," *Biophys. J.* 85:3696-3706 (2003).
Chakrabarti et al., "Molecular Basis of Proton Blockage in Aquaporins," *Structure* 12:65-74 (2004).
Dainty et al., "'Unstirred Layers' in Frog Skin," *J. Physiol.* 182:66-78 (1966).
de Groot et al., "Water Permeation Across Biological Membranes: Mechanism and Dynamics of Aquaporin-1 and GlpF," *Science* 294:2353-2357 (2001).
de Groot et al., "The Mechanism of Proton Exclusion in the Aquaporin-1 Water Channel," *J. Mol. Biol.* 333:279-293 (2003).
Fettiplace et al., "Water Permeability of Lipid Membranes," *Physiological Reviews* 60:510-550 (1980).
Fu et al., "Structure of a Glycerol-Conducting Channel and the Basis for Its Selectivity," *Science* 290:481-486 (2000).
Heymann et al., "Aquaporins: Phylogeny, Structure, and Physiology of Water Channels," *News Physiol. Sci.* 14:187-193 (1999).
Ilan et al., "The Mechanism of Proton Exclusion in Aquaporin Channels," *Proteins: Structure, Function, and Bioinformatics* 55:223-228 (2004).
Jensen et al., "Electrostatic Tuning of Permeation and Selectivity in Aquaporin Water Channels," *Biophys. J.* 85:2884-2899 (2003).
Leonenko et al., "Supported Planar Bilayer Formation by Vesicle Fusion: The Interaction of Phospholipid Vesicles with Surfaces and the Effect of Gramicidin on Bilayer Properties Using Atomic Force Microscopy," *Biochim. Biophys. Acta* 1509:131-147 (2000).
Lin et al., "Amyloid β Protein Forms Ion Channels: Implications for Alzheimer's Disease Pathophysiology," *FASEB J.* 15:2433-2444 (2001).
Montal et al., "Formation of Biomolecular Membranes from Lipid Monolayers and a Study of Their Electrical Properties," *Proc. Nat. Acad. Sci. U.S.A.* 69:3561-3566 (1972).
Mou et al., "Gramicidin A Aggregation in Supported Gel State Phosphatidylcholine Bilayers," *Biochemistry* 35:3222-3226 (1996).
Mueller et al., "Reconstitution of Cell Membrane Structure in Vitro and Its Transformation into an Excitable System," *Nature* 194: 979-980 (1962).
Murata et al., "Structural Determinants of Water Permeation Through Aquaporin-1," *Nature* 407:599-605 (2000).

Preston et al., "Appearance of Water Channels in *Xenopus* Oocytes Expressing Red Cell CHIP28 Protein," *Science* 256:385-387 (1992).
Pohl et al., "The Effect of a Transmembrane Osmotic Flux on the Ion Concentration Distribution in the Immediate Membrane Vicinity Measured by Microelectrodes," *Biophys. J.* 72:1711-1718 (1997).
Pohl et al., "Highly Selective Water Channel Activity Measured by Voltage Clamp: Analysis of Planar Lipid Bilayers Reconstituted with Purified AqpZ," *Proc. Natl. Acad. Sci. U.S.A.* 98:9624-9629 (2001).
Reimhult et al., "Intact Vesicle Adsorption and Supported Biomembrane Formation from Vesicles in Solution: Influence of Surface Chemistry, Vesicle Size, Temperature, and Osmotic Pressure," *Langmuir* 19:1681-1691 (2003).
Ren et al., "Visualization of Water-Selective Pore by Electron Crystallography in Vitreous Ice," *Proc. Natl. Acad. Sci. U.S.A.* 98:1398-1403 (2001).
Reviakine et al., "Formation of Supported Phospholipid Bilayers from Unilamellar Vesicles Investigated by Atomic Force Microscopy," *Langmuir* 16:1806-1815 (2000).
Rinia et al., "Visualization of Highly Ordered Striated Domains Induced by Transmembrane Peptides in Supported Phosphatidylcholine Bilayers," *Biochemistry* 39:5852-5858 (2000).
Saparov et al., "Water and Ion Permeation of Aquaporin-1 in Planar Lipid Bilayers," *J. Biol. Chem.* 276:31515-31520 (2001).
Simonsen et al., "Structure of Spin-Coated Lipid Films and Domain Formation in Supported Membranes Formed by Hydration," *Langmuir* 20:9720-9728 (2004).
Sui et al., "Structural Basis of Water-Specific Transport Through the AQP1 Water Channel," *Nature* 414:872-878 (2001).
Tajkhorshid et al., "Control of the Selectivity of the Aquaporin Water Channel Family by Global Orientation Tuning," *Science* 296:525-530 (2002).
Tokumasu et al., "Nanoscopic Lipid Domain Dynamics Revealed by Atomic Force Microscopy," *Biophys. J.* 84:2609-2618 (2003).
van Kan et al., "The Peptide Antibiotic Clavanin A Interacts Strongly and Specifically with Lipid Bilayers," *Biochemistry* 42:11366-11372 (2003).
Webber et al., "Hydrodynamic Studies of Adsorbed Diblock Copolymers in Porous Membranes," *Macromolecules* 23:1026-1034 (1990).
Zeidel et al., "Reconstitution of Functional Water Channels in Liposomes Containing Purified Red Cell CHIP28 Protein," *Biochemistry* 31:7436-7440 (1992).
Zhu et al., "Theory and Simulation of Water Permeation in Aquaporin-1," *Biophys. J.* 86:50-57 (2004).
International Search Report for PCT/DK2006/000520, completed Jan. 4, 2007, mailed Jan. 12, 2007.
International Preliminary Report on Patentability for PCT/DK2006/000520, issued Mar. 26, 2008.
Written Opinion of the International Searching Authority for PCT/DK2006/000520, completed Jan. 4, 2007, mailed Jan. 12, 2007.
Communication in European Patent Application No. 06791419.2-1213, mailed May 12, 2009.
"Basic Principles of Membrane Technology," Marcel Murder, Kluwer Academic Publishers, Chapter VI, pp. 198-280, 2001.
Cath et al., "Forward osmosis: Principles, applications, and recent development," *J. Mem. Sci.* 281: 70-87, 2006.
Loeb, "Production of energy from concentrated brines by pressure-retarded osmosis," *J. Mem. Sci.* 1:49-63, 1976.
Post et al., "Salinity-gradient power: Evaluation of pressure-retarded osmosis and reverse electrodialysis," *J. Mem.Sci.* 288:218-230, 2007.
Wick and Schmitt, "Prospects for renewable energy from the sea," *Mar. Technol. Soc.* 11:16-21, 1977.

\* cited by examiner

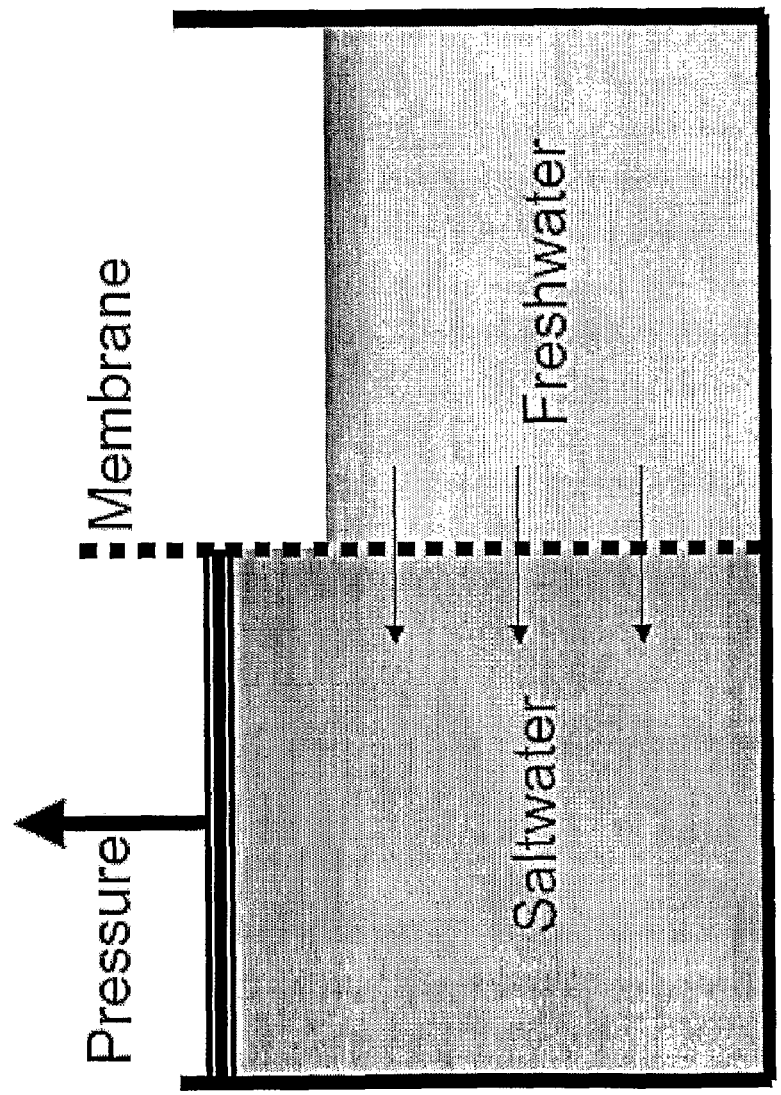

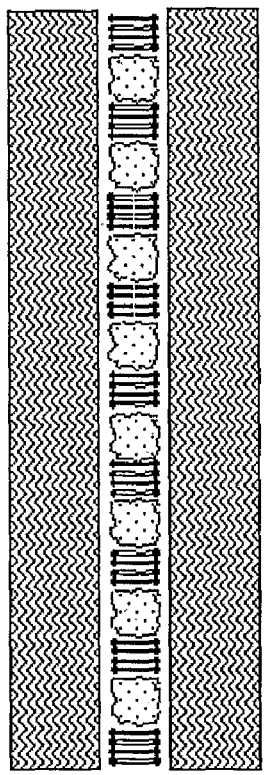

Fig. 2

Supported membrane matrix with incorporated Aquaporin molecules

- Porous support of lipid bilayer/block copolymer membrane, like mica, mica tape, polysulfon, AlO₂, cellulose or other support with hydrophilic surface.
- Planar lipid bilayer/block copolymer membrane with incorporated aquaporins.
- Aquaporin molecule
- Phospholipid molecule, block copolymer or other amphiphilic molecule

BIOMIMETIC WATER MEMBRANE COMPRISING AQUAPORINS USED IN THE PRODUCTION OF SALINITY POWER

CROSS-REFERENCE TO RELATED APPLICATIONS

This application is the National Stage of PCT/DK2006/000520, filed Sep. 20, 2006, which claims benefit of U.S. Provisional Application No. 60/718,890, filed Sep. 20, 2005, Danish Application No. PA 2005 01309, filed Sep. 20, 2005, and PCT/DK2006/000278, filed May 19, 2006.

FIELD OF THE INVENTION

The present invention relates to a novel biomimetic water membrane comprising functional aquaporin channels or tetramers of aquaporin channels, suitable for transporting water from one side of the membrane to the other side, driven by an osmotic pressure gradient. Pressure retarded osmosis will be used in the production of salinity power.

By this we use the principles of nature to produce pure and environmentally friendly energy.

BACKGROUND OF THE INVENTION

When salt-containing water is diluted in fresh water, an extensive energy potential can be extracted. Salinity power is stable energy that is not reliant on weather or wind. It is renewable and does not generate any known serious environmental effects.

The principle of salinity power is called pressure-retarded osmosis (PRO), and refers to utilising the energy that can be released when salt water mixes with fresh water. This happens by carrying every chamber in a distinct vessel of a membrane. The membrane tolerates through-flow of fresh water, but not salt water, see FIG. 1. The fresh water will then flow through to the other side, and the energy in this flow can be tapped by using a turbine. The natural need for dilution of salt is so great that it corresponds to 27 bars, in other words five to six times the pressure in a water tap or to a downfall of 260 meters for fresh water. This power is the so-called osmotic pressure between fresh water and salt water.

Salinity power is one of the largest sources of renewable energy that is still not exploited. The exploitable potential world-wide is estimated to be 2000 TWh annually. Still considerable technological development is necessary to fully utilize this resource. Thus, the potential cost of energy from this source is still higher than most traditional hydropower, but is comparable to other forms of renewable energy that are already produced in full-scale plants.

For salinity power production, fouling and flow capacity of membranes are critical, and today the water membrane separating the two chambers, with seawater on one side and fresh water on the other side, respectively, is the limiting step in exporting the potential in salinity power production.

Since the discovery of the aquaporin water transport proteins are distinguished by their ability to selectively transport $H_2O$ molecules across biological membranes there has been a certain interest in devising an artificial water membrane incorporating these proteins, cf. published US Patent Application No. 2004/0049230 "Biomimetic membranes" which aims to describe how water transport proteins are embedded in a membrane to enable water purification. The preferred form described has the form of a conventional filter disk. To fabricate such a disk, a 5 nm thick monolayer of synthetic triblock copolymer and protein is deposited on the surface of a 25 mm commercial ultrafiltration disk using a Langmuir-Blodgett trough. The monolayer on the disk is then cross-linked using UV light to the polymer to increase its durability.

It has been suggested that a water purification technology could be created by expressing the aquaporin protein into lipid bilayer vesicles and cast these membranes on porous supports, cf. James R. Swartz, home page.

Furthermore, the present assignee has previously submitted an international patent application where aquaporins are comprised in a sandwich construction having either at least two permeable support layers separated by at least one lipid bilayer comprising functional aquaporin water channels or having a lipid bilayer surrounding a perforated hydrophobic support layer, cf. International patent application No. PCT/DK2006/000278, which claims the priorities of Danish patent application No. PA 2005 00740 and U.S. provisional patent application No. 60/683,466. The water channel comprising membranes disclosed in PCT/DK2006/000278 are incorporated by reference herein and are regarded as the most promising water membranes for use in the present invention and hence all disclosures in PCT/DK2006/000278 relating to water membranes and their preparation are regarded as important embodiments of the pre-sent invention.

All previously disclosed applications of using aquaporins in artificial membranes have been targeted at producing purified water. The present invention broadens the scope of using nature's water transporting channels, aquaporins, into the field of sustainable energy solutions.

The present invention aims at using biomimetic membranes comprising functional aquaporin channels to produce salinity power, using pressure retarded osmosis.

SUMMARY OF THE INVENTION

The present invention relates in one aspect to a biomimetic membrane comprising aquaporins used for pressure retarded osmosis (PRO), and in another aspect the present invention relates to the implementation of said membrane in a PRO system used in the production of salinity power.

The biomimetic water membrane comprising aquaporin water transport proteins can be produced using multiple different procedures.

The present invention relates to any biomimetic water membrane comprising aquaporins used in the production of salinity power.

Advantages of the present invention include the use of nature's own systems for transporting and lifting water to the top of trees. Aquaporins are molecules designed by nature to transport water using osmotic pressure as the driving force—This is exploited in the present invention to produce environmentally friendly energy.

BRIEF DESCRIPTION OF THE DRAWINGS

FIG. 1 is a drawing describing the principles behind pressure retarded osmosis. Two chambers are filled with seawater and fresh water, respectively and separated by a water permeable membrane. The osmotic pressure gradient will produce a flow of fresh water into the seawater chamber building up a pressure, which can be used to produce energy.

FIG. 2 is a drawing describing the design of a biomimetic membrane comprising aquaporins.

The figure shows the various components of the membrane according to one embodiment of the present invention having supported lipid bilayers or block copolymers with incorporated aquaporin molecules in a sandwich structured example of a water membrane according to the invention.

Figure 3:
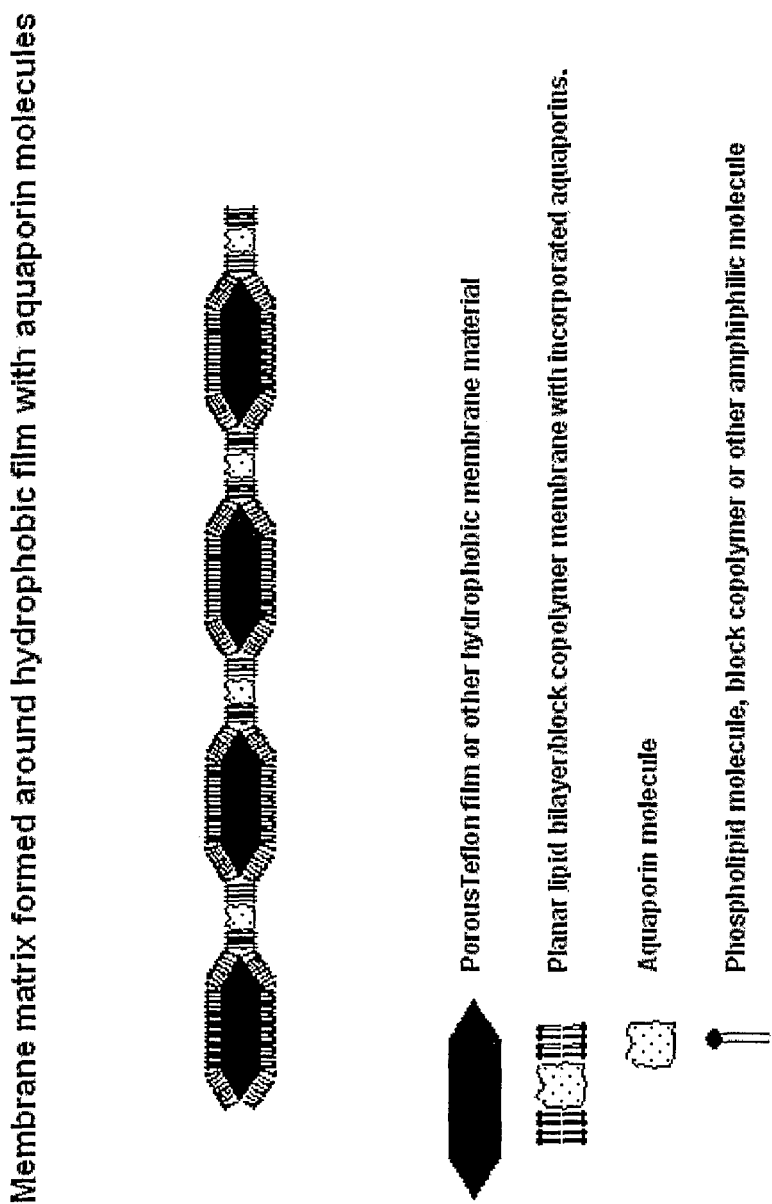

FIG. 3 is a drawing describing the design of a biomimetic membrane comprising aquaporins.

The figure shows the various components of the membrane according to another embodiment of the present invention having supported lipid bilayers or block copolymers with incorporated aquaporin molecules sandwiched around a film made from a porous, solid, chemically inert polymer of tetrafluoroethylene, e.g. a porous Teflon™ film.

Figure 4:
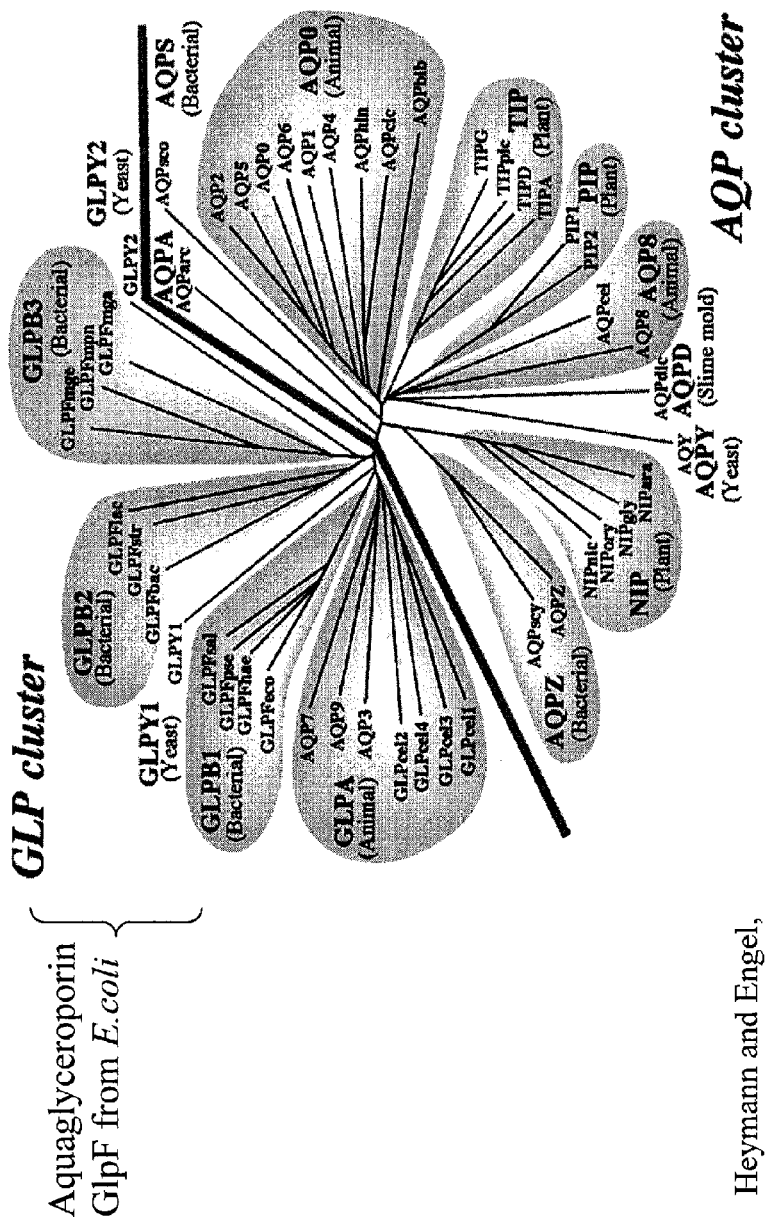

FIG. 4 illustrates the various members of the aquaporin and aquaglyceroporin group of proteins.

Figure 5:
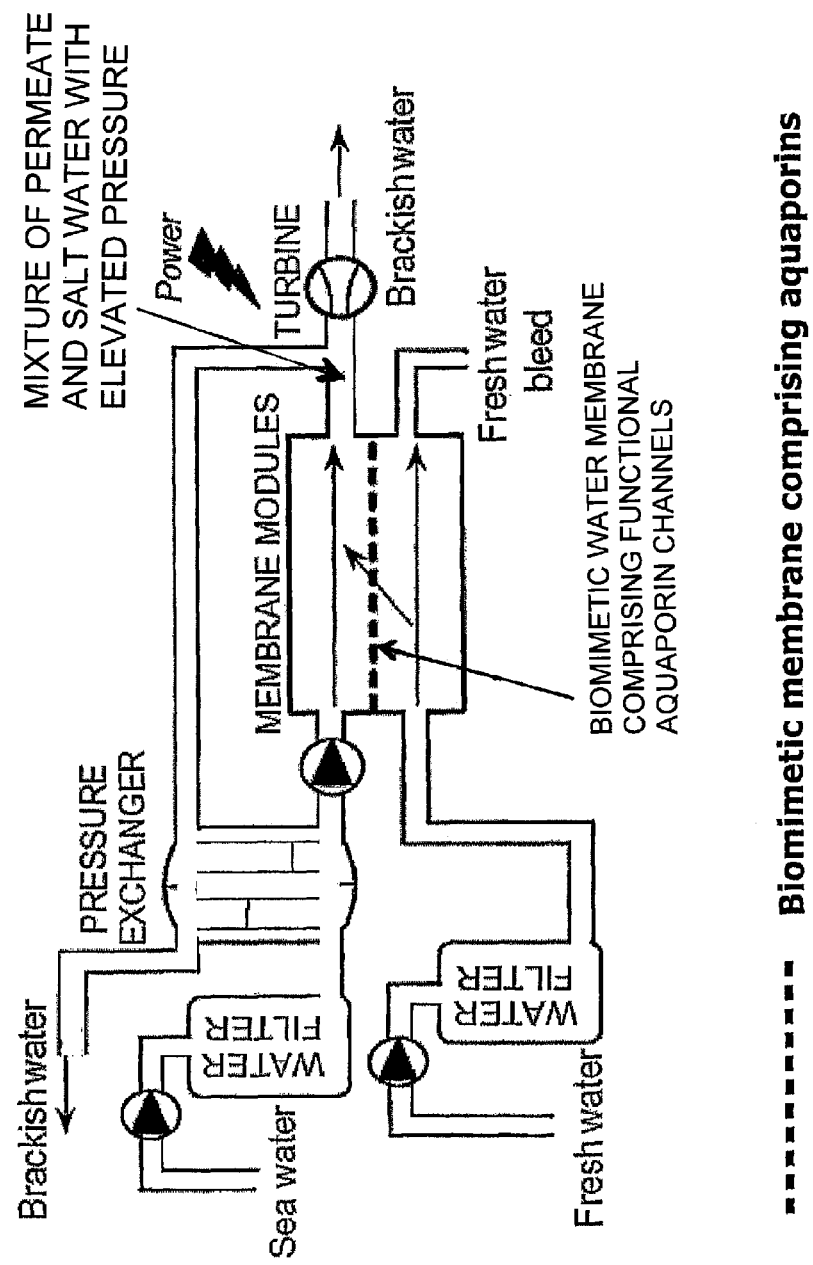

FIG. 5 is an example of a PRO system. It shows a PRO plant wherein fresh water as well as sea water is fed into separate water filters, prior to the streams are passing by one another on each side of a semi-permeable membrane, in this case the biomimetic water membranes comprising functional aquaporin channels. A portion of the mixture of permeate and salt water with elevated pressure is then passed to a turbine for the production of electric power. The balance of the permeate stream is passed to a pressure exchanger where incoming sea water is pressurized and fed into the membrane module.

DETAILED DESCRIPTION OF THE INVENTION

The salinity power principle was invented by an American Israeli researcher in the 1970s, but no one has so far managed to develop a membrane technology that is good enough to benefit from the potential energy stored in the osmotic gradient between seawater and fresh water. Biomimetic water membranes comprising functional aquaporin channels might be the answer.

In the present context, a "water membrane" denotes a structure which allows the passage of water, whereas most other materials or substances are not allowed passage at the same time. Preferred water membranes used in the present invention a essentially only permeable for water (and in some cases glycerol), whereas solutes and other solvents are not allowed passage.

Aguaporins

Living cells are enclosed by a lipid bilayer membrane, separating the cells from other cells and their extracellular medium. Lipid bilayer membranes are essentially impermeable to water, ions, and other polar molecules; yet, in many instances, such entities need to be rapidly and selectively transported across a membrane, often in response to an extra- or intracellular signal. The water-transporting task is accomplished by aquaporin water channel proteins (Preston et al., 1992). Aquaporins are crucial for life in any form and they are found in all organisms, from bacteria via plants to man. Aquaporins facilitate rapid, highly selective water transport, thus allowing the cell to regulate its volume and internal osmotic pressure according to hydrostatic and/or osmotic pressure differences across the cell membrane. The physiological importance of the aquaporin in humans is perhaps most conspicuous in the kidney, where ~150-200 liters of water need to be reabsorbed from the primary urine each day, that is, aquaporin facilitated water transport is invoked when water rapidly must be retrieved from a body fluid. In kidneys, this is made possible mainly by two aquaporins denoted AQP1 and AQP2 (11 different aquaporins are known in humans). In plants, aquaporins are also critical for water absorption in the root and for maintaining the water balance throughout the plant (Agre et al., 1998, Borgnia et al., 1999). In plants, water is absorbed by the same osmotic forces as this invention intends to use in a PRO system in the production of salinity power.

Studies of water transport in various organisms and tissues suggested that aquaporins have a narrow pore preventing any flow of large molecules, ions (salts) and even protons ($H_3O+$) and hydroxyl ions (OH−) while maintaining an extremely high water permeation rate; ~$10^9$ molecules $H_2O$ per channel per second (Agre et al., 1998, Borgnia et al., 1999). Until 2000 and 2001, where the first high-resolution 3D structure of AQP1 and that of the related glycerol-conducting bacterial channel protein aquaglyceroporin GlpF were reported (Fu et al., 2000; Murata et al., 2000; Ren et al., 2001; Sui et al., 2001), little was known about the origin of water selectivity.

However, based on the experimental structures, detailed computer models were put forward explaining not only the high permeation rate and the strict water selectivity but also the ability of aquaporins to prevent proton leakage (de Groot and Grubmuller, 2001; Tajkhorshid et al., 2002, Jensen et al., 2003, Zhu et al. 2003, de Groot et al., 2003, Burykin and Warshel 2003, Ilan et al., 2004, Chakrabarti at al., 2004). In essence, the architecture of the aquaporin channel allows water molecules to pass only in a single file while electrostatic tuning of the channel interior controls aquaporin selectivity against any charged species, that is, trans-port of any salt (ion) as well as protons and hydroxyl ions is abrogated (de Groot and Grubmuller, 2001; Tajkhorshid et al., 2002, Jensen et al., 2003, Zhu et al. 2003, de Groot et al., 2003, Burykin and Warshel 2003, Ilan et al., 2004, Chakrabarti at al., 2004). In short, this implies that only water molecules pass through the aquaporin water pore, nothing else.

Each unit in an aquaporin channel transports ~$10^9$ $H_2O$ molecules/sec, i.e., ~$4 \cdot 10^9$ molecules/channel/sec. Hence, 1 g of aquaporin is capable of transporting ~720 liter of water/sec at very high pressure.

The term "aquaporin family of membrane proteins" as used herein includes also the GLpF proteins which in addition to water molecules also channels glycerol.

The present invention relates in one aspect to a biomimetic membrane comprising aquaporins used for pressure retarded osmosis, and in another aspect the present invention relates to the implementation of said membrane in a PRO system used in the production of salinity power.

The biomimetic water membrane comprising aquaporin water transport proteins can be produced using multiple different procedures. Different methods have been described in patent applications described earlier.

Aspects Relating to Use of Lipid Bilayer Membranes

In the following procedures where aquaporins have been reconstituted in lipid vesicles, and transformed into a supported lipid bilayer membranes to form a water filtering membrane using a method such as the Langmuir-Blodgett method are described:

Intrinsic permeability of the membrane material must be secured. A material with low permeability is to be preferred, however, it must at the same time be robust and able to incorporate aquaporins to constitute overall a stable and dense 2D filtering array. Various procedures are commonly used for preparing supported bilayers. A simple technique is the Langmuir-Blodgett method. A solution of lipid in a suitable organic solvent is spread on an aqueous sub phase in a Langmuir trough and the organic solvent is evaporated. A pair of movable barriers is used to compress the lipid film laterally to a desired surface pressure. Then the substrate is passed vertically through the film thereby transferring a one molecule thick lipid layer (monolayer) onto the substrate. A second monolayer can be transferred by passing the substrate through the film once more. A total of three monolayers have been transferred by the vertical (Langmuir-Blodgett) deposition method, however, a fourth layer may be transferred by using horizontal, the so called Langmuir-Schaeffer (LS), deposition for the last layer. The methods can be used with a variety of lipids. Native biological membranes often are asymmetric. Both LB and LS offer the possibility of preparing asymmetric bilayers. This is done by exchanging the lipid film on the sub phase between depositions.

Another way of preparing supported bilayers is the vesicle fusion method (Brian and McConnell 1984). A solution of small unilamellar vesicles (SUVs) is applied onto the surface of a piece of hydrophilized silicon or freshly cleaved mica. When this sample is left at low temperature (4° C.) the vesicles fuse with the surface to make a continuous bilayer Without being bound to any theory it has been hypothesized that the vesicles first adsorb to the surface of the substrate then fuse to make a flat, pancake-like structure and finally rupture and spread out resulting in a single bilayer on the surface (Reviakine and Brisson 2000). It has also been suggested that after fusion with the substrate only the part of the vesicle which is in direct contact with the substrate becomes the supported bilayer (Leonenko et al. 2000). With this mechanism the vesicle ruptures at the edges with the highest curvature and the top part of the bilayer may then migrate to the surface of the substrate to increase the size of the formed supported bilayer. It has been reported that bilayers are formed within minutes of applicating the solution onto the substrate (Tokumasu et al. 2003) but this short incubation time may result in incomplete bilayers. Hours or overnight incubation have also been reported (Reimhult et al. 2003, Rinia et al. 2000).

A third technique which can be used to prepare supported bilayers is spin-coating (Reimhult et al. 2003, Simonsen and Bagatolli 2004). In spin-coating the lipid is dissolved in a suitable solvent and a droplet is placed on the substrate which is then rotated while the solvent evaporates and a lipid coating is produced. Depending on the concentration of the lipid solution the spin-coated film consist of one or more lipid bilayers. However, upon hydration the multiple layers have been shown to be unstable, and usually only one supported bilayer remains on the surface. This procedure is easy and fast and it has been exercised with low-melting lipids (POPC) as well as lipids with intermediate (DPPC) and very high transition temperature (ceramide). Useful lipids include, e.g., phospholipids and amphiphilic lipids.

When one wants to incorporate peptides and proteins in the supported bilayers the vesicle fusion technique is the most applicable, since the other procedures mentioned involve solubilization of the proteins or peptides in organic solvents. Many membrane proteins may denature in organic solvents especially if they contain large domains exposed to the aqueous solution on either side of the membrane. It is therefore preferred to insert the peptides or proteins in vesicles. Many peptides and proteins such as aquaporins can be co-solubilized with lipid in the organic solvent prior to formation of vesicles and the peptide containing vesicles are then applied to the substrate. This has been done with a number of peptides, for example WALP (Rinia et al. 2000), gramicidin (Mou et al. 1996), clavanin A (van Kan et al. 2003) and Amyloid β Protein (Lin et al. 2001). Membrane proteins such as aquaporins are preferably inserted into vesicles by other means. This can be done using the strategies for reconstitution of membrane proteins into vesicles as described for cytochrome c oxidase as a model protein in the introduction to chapter 4 on pages 41-45 of the herein incorporated thesis "Supported bilayers as models of biological membranes" by Danielle Keller, February 2005, MEMPHYS-center for biomembrane physics, Physics Department, University of Southern Denmark and Dansih Polymer Centre, Risø National Laboratory, Denmark.

Multi layer stacking of the individual 2D-arrays are possible and may be desirable. The final dimensions of the stacked arrays will depend on overall robustness and on intrinsic permeability of the chosen membrane material/membrane composition. Stacking might depart from a system where proteins trivially are embedded in a single, probably supported, lipid bilayer. A subsequent series of collapsing vesicles events on the supported bilayer could then provide multi layer filtering unit-devices, given that the vesicles prerequisite are reconstituted with an appropriate aquaporin. Incorporation of the stacked unit-device into a stabilising membrane or stabilising polymer matrix and subsequent stitching of these individual units would yield an overall filtering mesh, eventually via self-assembly processes.

Table 1 is a list of useful lipids for the formation of lipid bilayers to be used in the water membranes of the invention:

Useful lipids for reconstitution of aquaporins and formation of lipid bilayers are: POPC, DPPC, ceramide and mixtures thereof, cf. Table 1.

TABLE 1

Phosphatidylcholines:

1,2-dimyristoylphosphatidylcholine (DMPC)
1,2-dipalmitoylphosphatidylcholine (DPPC)
1,2-distearoylphosphatidylcholine (DSPC)
1,2-dioleoylphosphatidylcholine (DOPC)
1,2-dimyristoleoylphosphatidylcholine
1,2-dipalmitoleoylphosphatidylcholine
1,2-dipetroselinoylphosphatidylcholine
1,2-dielaidoylphosphatidylcholine
1,2-dilinoleoylphosphatidylcholine
1,2-dilinolenoylphosphatidylcholine
1,2-dieicosenoylphosphatidylcholine
1,2-diarachidonoylphosphatidylcholine
1,2-dierucoylphosphatidylcholine
1,2-dnervonoylphosphatidylcholine
1-palmitoyl-2-oleoylphosphatidylcholine (POPC)
1-palmitoyl-2-linoleoylphosphatidylcholine
1-palmitoyl-2-arachidonoylphosphatidylcholine
1-palmitoyl-2-docosahexaenoylphosphatidylcholine
1-stearoyl-2-oleoylphosphatidylcholine (SOPC)
1-stearoyl-2-linoleoylphosphatidylcholine
1-stearoyl-2-arachidonoylphosphatidylcholine
1-stearoyl-2-docosahexaenoylphosphatidylcholine
1-oleoyl-2-palmitoylphosphatidylcholine
1-oleoyl-2-stearoylphosphatidylcholine
1,2-didocosahexaenoylphosphatidylcholine Phosphatidylethanolamines:

1,2-dimyristoylphosphatidylethanolamine (DMPE)
1,2-dipalmitoylphosphatidylethanolamine (DPPE)
1,2-distearoylphosphatidylethanolamine (DSPE)
1,2-dioleoylphosphatidylethanolamine (DOPE)
1-palmitoyl-2-oleoylphosphatidylethanolamine (POPE)
1-palmitoyl-2-linoleoylphosphatidylethanolamine
1-palmitoyl-2-arachidonoylphosphatidylethanolamine
1-palmitoyl-2-docosahexaenoylphosphatidylethanolamine
1-stearoyl-2-oleoylphosphatidylethanolamine (SOPE)
1-stearoyl-2-linoleoylphosphatidylethanolamine
1-stearoyl-2-arachidonoylphosphatidylethanolamine
1-stearoyl-2-docosahexaenoylphosphatidylethanolamine
1,2-dielaidoylphosphatidylethanolamine
1,2-dilinoleoylphosphatidylethanolamine
1,2-dilinolenoylphosphatidylethanolamine
1,2-diarachidonoylphosphatidylethanolamine
1,2-didocosahexaenoylphosphatidylethanolamine
1,2-dipalmitoleoylphosphatidylethanolamine Phosphatidylglycerols:

1,2-dimyristoylphosphatidylglycerol (DMPG)
1,2-dipalmitoylphosphatidylglycerol (DPPG)
1,2-distearoylphosphatidylglycerol (DSPG)
1,2-dioleoylphosphatidylglycerol (DOPG)
1-palmitoyl-2-oleoylphosphatidylglycerol (POPG)
1-palmitoyl-2-linoleoylphosphatidylglycerol TABLE 1-continued 1-palmitoyl-2-arachidonoylphosphatidylglycerol
1-palmitoyl-2-docosahexaenoylphosphatidylglycerol
1-stearoyl-2-oleoylphosphatidylglycerol (SOPG)
1-stearoyl-2-linoleoylphosphatidylglycerol
1-stearoyl-2-arachidonoylphosphatidylglycerol
1-stearoyl-2-docosahexaenoylphosphatidylglycerol Phosphatidylserines:

1-palmitoyl-2-oleoylphosphatidylserine (POPS)
1-palmitoyl-2-linoleoylphosphatidylserine
1-palmitoyl-2-arachidonoylphosphatidylserine
1-palmitoyl-2-docosahexaenoylphosphatidylserine
1-stearoyl-2-oleoylphosphatidylserine (SOPS)
1-stearoyl-2-linoleoylphosphatidylserine
1-stearoyl-2-arachidonoylphosphatidylserine
1-stearoyl-2-docosahexaenoylphosphatidylserine
1,2-dimyristoylphosphatidylserine (DMPS)
1,2-dipalmitoylphosphatidylserine (DPPS)
1,2-distearoylphosphatidylserine (DSPS)
1,2-dioleoylphosphatidylserine (DOPS)
1,2-didocosahexaenoylphosphatidylserine
1,2-dierucoylphosphatidylserine Special lipids:

Cardiolipin
Bipolar lipids

Polymerizable lipids:

1,2-di-10,12-tricosadiynoyl-sn-glycero-3-phosphocholine (DTPC)
1,2-di-10,12-tricosadiynoyl-sn-glycero-3-phosphoethanolamine (DTPE)
1-palmitoyl-2,10,12-tricosadiynoyl-sn-glycero-3-phosphoethanolamine (PTPE)
(DC8,9PC [1,2-bis(10,12-tricosadiynoyl)-sn-glycero-3-phosphocholine]
diPhyPC [1,2-diphytanoyl-sn-glycero-3-phosphocholine]

Natural lipid extracts:

Egg yolk phosphatidylcholine
Bovine heart phosphatidylcholine
Brain phosphatidylcholine
Bovine liver phosphatidylcholine
Soybean phosphatidylcholine
E. Coli phosphatidylethanolamine
Bovine Heart phosphatidylethanolamine
Brain phosphatidylethanolamine
Bovine Liver phosphatidylethanolamine
Egg phosphatidylethanolamine
Bovine liver phosphatidylinositol
Soybean phosphatidylinositol
Brain phosphatidylserine
Soy phosphatidylserine Aspects Employing Block Copolymer Membranes In the following procedures where aquaporins are incorporated into block copolymer membranes simulating a natural environment is described:

One method of forming a biocompatible membrane, which is preferred for use with block copolymer-based membrane, is as follows:

Form a solution of block copolymer in solvent (BC solution). The solution can be a mixture of two or more block copolymers. The solution preferably contains 1 to 90% w/v copolymer, more preferably 2 to 20%, or yet more preferably 5 to 10%, such as 7%.

Prepare an aquaporin solution in the prepared BC solution, preferably by adding 1.0 to 50.0 mg/mL of the preferred aquaporin, more preferably 1.0 to 10.0 mg/mL.

Drop a small volume (e.g., 4 microliter) aquaporin/BC solution onto each aperture or each of a subset of apertures, and allow to dry, thereby removing the solvent.

Repeat this step as needed to cover all apertures.

The solvent is selected to be miscible with both the water component used in the process and the B component of the block copolymer. Appropriate solvents are believed to include methanol, ethanol, 2-propanol, 1-propanol, tetrahydrofuran, 1,4-dioxane, solvent mixtures that can include more apolar solvents such as dichloromethane so long as the mixture has the appropriate miscibility, and the like. (Solvent components that have any tendency to form protein-destructive contaminants such as peroxides can be appropriately purified and handled.) Solvent typically comprises 100% v/v or more of the applied aquaporin/BC solution, preferably 20% or more, and usefully 30% or more.

The above-described method of introducing aquaporin to a solution containing non-aqueous solvent(s) in the presence of block copolymers serves to stabilize the function of active aquaporins. The non-aqueous components can comprise all of the solvent.

The mixtures of block copolymers can be mixtures of two or more of the following classes, where the separate components can be of the same class but with a different distribution of polymer blocks:

Polymer source triblock copolymers E/EP/E, of poly(ethylene)(E) and poly(ethylenepropylene)(EP) triblock copolyampholytes. Among (N,N dimethylamino)isoprene, such polymers are Ai14S63A23, Ai31S23A46, Ai42S23A35, styrene, and methacrylic acid Ai56S23A21, Ai57S11A32.

Styrene-ethylene/butylene-styrene (KRATON) G 1650, a 29% styrene, 8000 solution triblock copolymer viscosity (25 wt-% polymer), 100% triblock styrene-ethylene/butylene-styrene (S-EB-S) block copolymer; (KRATON) G 1652, a 29% styrene, 1350 solution viscosity (25 wt-% polymer), 100% triblock S-EB-S block copolymer; (KRATON) G 1657, a 4200 solution viscosity (25 wt-% polymer), 35% diblock S-EB-S block copolymer; all available from the Shell Chemical Company. Such block copolymers include the styrene-ethylene/propylene (S-EP) types and are commercially available under the tradenames (KRATON) G 1726, a 28% styrene, 200 solution viscosity (25 wt-% polymer), 70% diblock S-EB-S block copolymer; (KRATON) G-1701X a 37% styrene, >50,000 solution viscosity, 100% diblock S-EP block copolymer; and (KRATON) G-1702X, a 28% styrene, >50,000 solution viscosity, 100% diblock SEP block copolymer.

Siloxane triblock copolymer PDMS-b-PCPMS-b-PDMSs (PDMS=polydimethylsiloxane, PCPMS=poly(3-cyanopropylmethylsiloxane) can be prepared through kinetically controlled polymerization of hexamethylcyclotrisiloxane initiated by lithium silanolate endcapped PCPMS macroinitiators. The macroinitiators can be prepared by equilibrating mixtures of 3-cyanopropylmethylcyclosiloxanes (DXCN) and dilithium diphenylsilanediolate (DLDPS). DxCNs can be synthesized by hydrolysis of 3-cyanopropylmethyldichlorosilane, followed by cyclization and equilibration of the resultant hydrolysates. DLDPS can be prepared by deprotonation of diphenylsilanediol with diphenylmethyllithium. Mixtures of DXCN and DLDPS can be equilibrated at 100° C. within 5-10 hours. By controlling the DxCN-to-DLDPS ratio, macroinitiators of different molecular weights are obtained. The major cyclics in the macroinitiator equilibrate are tetramer (8.6+−0.7 wt %), pentamer (6.3+−0.8 wt %) and hexamer (2.1+−0.5 wt %).

2.5 k-2.5 k-2.5 k, 4k-4-k-4-k, and 8k-8k-8k triblock copolymers have been characterized. These triblock copolymers are transparent, microphase separated and highly viscous liquids. PEO-PDMS-PEO triblock formed from Polyethylene oxide (PEO) and poly-copolymer dimethyl siloxane (PDMS). Functionalized poly (2 methyloxazoline)-block-: These A-B-A polymers include poly(dimethylsiloxane)-block-versions in which the A components have MW of poly (2-methyloxazoline) triblock approximately 2 kDa, and the B component of copolymer approximately 5 kDa, and (b) the A components have MW of approximately 1 kDa, and the B component of approximately 2 kDa. Poly(d/1-lactide) ("PLA")—PEG-PLA triblock copolymer. Poly(styrene-b-butadiene-b-styrene) triblock copolymer.

Poly(ethylene (such polymers included Pluronic F127, Pluronic P105, or oxide)/poly(propylene oxide) Pluronic L44 from BASF (Performance Chemicals). Triblock copolymers PDMS-PCPMS-PDMS. A series of epoxy and vinyl end-capped polysiloxane (polydimethylsiloxane-triblock copolymers with systematically varied molecular polycyanopropylmethylsiloxane) weights can be synthesized via anionic polymerization triblock copolymer using LiOH as an initiator. Polydiene-polystyrene-polydiene available as Protolyte A700 from DAIS-Analytic, Odessa, Fla. Azo-functional styrene-butadiene-HEMA triblock copolymer. Amphiphilic triblock copolymer carrying polymerizable end groups. Syndiotactic polymethylmethacrylate (sPMMA)-polybutadiene (PBD)-sPMMA triblock copolymer. Tertiary amine methacrylate triblock Biodegradable PLGA-b-PEO-b-PLGA triblock copolymer, Polyactide-b-polyisoprene-b-polyactide triblock copolymer, Poly(isoprene-block-styrene-block-dimethylsiloxane) triblock copolymer, Poly(ethylene oxide)-block-polystyrene-block-poly(ethylene oxide) triblock copolymer, Poly(ethylene oxide)-poly(THF)-poly(ethylene oxide) triblock copolymer. Ethylene oxide triblock Poly E-caprolactone (Birmingham Polymers, Birmingham), AL Poly(DL-lactide-co-glycolide) (Birmingham Polymers), Poly(DL-lactide) (Birmingham Polymers), Poly(L-lactide) (Birmingham Polymers), Poly(glycolide) (Birmingham Polymers), Poly(DL-lactide-co-caprolactone) (Birmingham Polymers), Styrene-Isoprene-styrene triblock (Japan Synthetic Rubber Co., Tokyo, Japan) MW=140 kg/mol, copolymer Block ratio of PS/PI=15/85. PMMA-b-PIB-b-PMMA Poly(methyl methacrylate) (PMMA) and polyisobutylene (PIB). PLGA-PEO-PLGA triblock Polymers of poly(DL-lactic acid-co-glycolic acid) copolymer (PLGA) and PEO. Sulfonated styrene/ethylene-butylene/styrene (S-SEBS) triblock copolymer proton conducting membrane. Poly(1-lactide)-block-poly(ethylene oxide)-block-poly(1-lactide) triblock copolymer Poly-ester-ester-ester triblock copolymer PLA/PEO/PLA triblock copolymer. The synthesis of the triblock copolymers can be prepared by ring-opening polymerization of DL-lactide or e-caprolactone in the presence of poly(ethylene glycol), using no-toxic Zn metal or calcium hydride as co-initiator instead of the stannous octoate. The composition of the co-polymers can be varied by adjusting the polyester/polyether ratio.

The above polymers can be used in mixtures of two or more of polymers in the same or different class. For example, in two polymer mixtures measured in weight percent of the first polymer, such mixtures can comprise 10-15%, 15-20%, 20-25%, 25-30%, 30-35%, 35-40%, 40-45% or 45-50%. Or, for example where three polymers are used: the first can comprise 10-15%, 15-20%, 20-25%, 25-30%, 30-35%, 35-40%, 40-45% or 45-50% of the whole of the polymer components, and the second can 10-15%, 15-20%, 20-25%, 25-30%, 30-35%, 35-40%, 40-45% or 45-50% of the remainder.

Other Features of the Aspects of the Invention

The water membranes used in the invention are preferably prepared according to the teachings in PCT/DK2006/000278. The teachings of that particular patent can be applied both to the preparation of water membranes comprising aquaporins in lipid bilayers and aquaporins included in block copolymers as detailed above.

Nevertheless, a number of preferred embodiments are described in the following:

As mentioned above, the water membrane may in one embodiment comprise a sandwich construction having at least two permeable support layers separated by at least one lipid bilayer or block copolymer comprising functional aquaporin water channels.

The water membrane in this embodiment may thus consist of an amphiphilic lipid membrane, such as a membrane comprising lipids described in Table 1 above, or a block copolymer. Thus, the lipid bilayer(s) essentially consist(s) of amphiphilic lipids selected from the group consisting of phospholipids, phosphoglycerides, sphingolipids, and cardiolipin, as well as mixtures thereof, e.g. phospholipids such as 1,2-dipalmitoyl-sn-phosphatidylcholine (DPPC), or mixtures of phospholipids.

Alternatively, the lipid bilayers may consist essentially of or contain polymerizable lipids, cf. Table 1.

The water membrane used in this embodiment of the invention thus comprises reconstituted aquaporin water channels in lipid bilayers in contackt with a porous support. The support layer used in the membranes useful in the invention should generally be compatible with the water membrane prepared as taught above.

Useful support materials with a hydrophilic surface for the preparation of water membranes according to the invention is preferably selected from mica such as muscovite, mica tape, polysulfon, $AlO_2$, and polymeric materials having a hydrophilic surface, e.g. cellulose. The support materials are essentially planar which means that the support is preferably planar, but curvature of the support is allowable, such as needed when spirally wound membranes are manufactured. In this case the support material is preferably flexible, such as cellulose membranes.

The porous support may preferably comprise a material such as mica having an essentially planar structure with a hydrophilic surface and wherein micro or nano pores have been formed, e.g. by etching. Hence, in a special embodiment, the permeable support layer comprises an essentially planar, hydrophilic layer comprising mica or mica tape having a layer thickness in the mm to μm scale and wherein nanopores having a diameter of less than approximately 50 nm (typically in the 10-40 nm range) have been formed (e.g. by etching such as by a track-etch technique). The mica is preferably muscovite.

The permeable support layers may also comprise a hydrophilized membrane surface, such as a membrane selected from the group consisting of silicone membranes, polysulfon, $AlO_2$, and polymers such as cellulose having a hydrophilic surface, wherein nanopores having a diameter of less than approximately 50 nm (typically in the 10-40 nm range) have been formed.

The lipid membrane comprising aquaporin channels may be a bilayer resembling the natural constitution of biological cell membranes, or the lipid membrane may consist of multiple bilayers of fused deposited lipid vesicles. The lipids are preferably of amphiphilic nature, such as the phospholipids (or phosphoglycerides), sphingolipids and cardiolipin. When depositing the lipid layers on the porous substrate, the aquaporin channels may preferably be deposited adjacent to or in the preexisting pores in the support material.

The permeable or porous support used in preferred embodiments of the invention is preferably prepared according to R. M. Webber, J. L. Anderson, M. S. John, Macromolecules 23 (1990), 1026-1034

It is preferred to obtain a final number and distribution of pores which approximately equals the number and distribution of aquaporin channels in the lipid layer.

As mentioned above, another embodiment entails reconstitution of aquaporin water channels in a planar lipid bilayer assembled around a porous support membrane with a hydrophobic surface, such as teflon film, where lipid monolayers assemble on each side of the porous support membrane. In the pores of the porous support membrane lipid bilayers will assemble, where aquaporin water channels can be reconstituted.

This embodiment thus utilises a water membrane comprising a sandwich construction having at least two lipid monolayers, which, when assembled into one bilayer, comprises functional aquaporin water channels, said at least two lipid monolayers being separated by at least one permeable support layer. Typically, the support layer comprises a hydrophobic perforated material which forms the contact surface with the lipid monolayers and wherein the lipid bilayer is formed in the perforations of the hydrophobic perforated material.

It is preferred that the hydrophobic material in this embodiment has a degree of hydrophobicity corresponding to a contact angle of at least 100° between a droplet of deionized water and the hydrophobic material, where the contact angle measurement is performed at 20° C. and atmospheric pressure, but higher degrees of hydrophobicity are preferred, such as those corresponding to contact angles of at least 105°, 110°, 120° and 120°. Preferred hydrophobic materials are parafilm or Teflon.

The hydrophobic material is typically planar (but may be flexible and thus curved) and the perforations are typically evenly distributed and substantially all of substantially the same geometric shape in the intermediate plane between the 2 surfaces of the hydrophobic material; details pertaining to the perforations in the hydrophobic material are provided below.

The "intermediate plane" is defined as the plane consisting of points from which the perpendicular distance to either both of the 2 surfaces of the planar hydrophobic material is the same.

The size of the perforations in the hydrophobic material should merely ensure that stable bilayers of amphiphilic lipids can be formed in the perforations, so they may have sizes in the nm, μm or mm range.

The hydrophobic material is preferably perforated in such a way that the ratio between perforation are and non-perforated area of the material is maximized, since this provides a maximum area of lipid bilayer with aquaporins to effect water transport. The pattern constituted by the perforations is thus of importance as is the distance between each perforation. An optimum pattern is a hexagonal arrangement of the perforations with a minimum "wall thickness" between each perforation in the pattern. However, at quadratic pattern may also prove sufficient.

The water membrane used in this embodiment of the invention hence also comprises an amphiphilic lipid membrane, such as a membrane comprising lipids described in Table 1. Thus, the lipid bilayer(s) essentially consist(s) of amphiphilic lipids selected from the group consisting of phospholipids, phosphoglycerides, sphingolipids, and cardiolipin, as well as mixtures thereof, e.g. phospholipids such as 1,2-dipalmitoyl-sn-phosphatidylcholine (DPPC), or mixtures of phospholipids. The difference from the first aspect is primarily that the membrane only constitutes a bilayer in areas where the hydrophobic support is perforated, whereas the lipids are organised with their hydrophobic ends facing the hydrophobic support and the hydrophilic ends facing the aqueous environment.

Useful aquaporins for the preparation of water membranes according to the invention are: AQP1, TIP, PIP, NIP, cf. FIG. 4, and mixtures and hybrids thereof. The aquaporins of plant origin are especially desirable, since the risk of including contaminants, such as pathogenic viruses and prions, that are harmful to humans is greatly reduced. In addition, the plant aquaporins are natural gene products of plants and can be overexpressed and produced in plants.

The aquaporin water channel is thus preferably selected from the group consisting of aquaglyceroporins (GLpF), such as a GLPA channel, a GLPB1 channel, a GLPB2 channel, a GLPB3 channel, and a GLPY2 channel, and mixtures and hybrids thereof.

The water membranes used in the invention are preferably enclosed in a stabilizing permeable or porous membrane which may be rigid or flexible and which may serve as protection of the water membrane as well as a pre-filter to exclude coarse particulate matter from the aqueous liquid to be purified. Alternatively or additionally, the water membrane of the invention may be deposited on a filter disk to create a water filter.

Useful materials for the stabilizing membrane optionally used to enclose the water membranes of the invention are micro-porous silicone membranes having a relatively small pore size and solidifying at about room temperature or at a temperature below about 50° C.

Biocompatible membranes can be formed against a solid material, such as by coating onto glass, carbon that is surface modified to increase hydrophobicity, or a polymer (such as polyvinyl acetate, PDMS, Kapton(R), a perfluorinated polymer, Teflon, PVDF, PEEK, polyester, or UHMWPE, polypropylene or polysulfone). Polymers such as PDMS provide an excellent support that can be used to establish openings on which biocompatible membranes can be formed.

Useful porous materials for the preparation of water membranes according to the Mueller based lipid bilayer membranes (Mueller et al., 1962) or the Montal decane based membranes (Montal et al., 1972) are, teflon films and other porous membrane materials with hydrophobic surface properties.

The invention also relates to the upscaling of these membrane types, where multiple holes are formed in a teflon partition film or another material with hydrophobic surface properties, and a lipid bilayer membrane or a block copolymer membrane comprising aquaporins are formed around the material according to the design shown in FIG. 3.

Useful materials for the stabilizing membrane optionally used to enclose the water membrane of the invention are micro-porous silicone membranes having a relatively small pore size and which solidifies at about room temperature or at a temperature below about 50° C.

The inventive membranes of the invention will only pass water, thus facilitating pressure retarded osmosis. The aquaporins are known to exclude the passage of all contaminants, including bacteria, viruses, minerals, proteins, DNA, salts, detergents, dissolved gases, and even protons from an aqueous solution. The related family of aquaglyceroporins (GLpF) are in addition able to transport glycerol. It has been shown that water movement is symmetrical and can proceed in either direction; this fact is important because this process does not consume energy. Water moves through the membrane in a particular direction caused by the osmotic pressure.

Aquaporins are also mutable. Since the proteins may be specifically expressed in host bacteria according to a genetic sequence that influences its final shape and function, a technician can easily change its genetic code in order to change the protein's characteristics. Therefore the protein can be engineered to fulfill a desired application that may be different from the protein's original function. For example, by simply changing a particular amino acid residue near the center of the water channel to cysteine, the aquaporins produced would bind any free mercury in the solution and cease transporting water due to the blockage. Thus, these mutant proteins used in a membrane device could detect mercury contamination in a water sample by simply ceasing flow when the concentration of the toxic substance rises too high.

Aquaporin membranes are faster than conventional systems. A conventional high-speed reverse osmosis unit can make about 28.4 liters (7.5 gallons) of clean water every minute. Current research shows the movement of water molecules across an aquaporin saturated lipid membrane (0.0177 $mm^2$) at the rate of 54 µ.mol/sec. (Pohl, P., Saparov, S. M., Borgnia, M. J., and Agre, P., (2001), Proceedings of the National Academy of Sciences 98, p. 9624-9629).

Lastly, the novel protein-based membranes are inexpensive to produce. Lipid micro vesicles comprising cell membrane fractions with AQP1 derived from bovine red blood cells are a cheap source of aquaporin.

Alternatively, aquaporin may be harvested in milligram quantities from an engineered *E. coli* bacterial strain. It is estimated that about 2.5 mg of pure protein can be obtained from each liter of culture that is producing it, cf. published US Patent Application No. 2004/0049230.

While the present invention has been described with reference to specific embodiments thereof, it will be appreciated that numerous variations, modifications, and embodiments are possible, and accordingly, all such variations, modifications, and embodiments are to be construed as being within the spirit and scope of the present invention.

Additional aspects, features and embodiments of the invention will be more fully apparent from the ensuing disclosure and appended claims.

Examples of how functional aquaporins can be incorporated into a water membrane have been described, however the present invention is not limited by these examples. The present invention relates to any biomimetic water membrane comprising aquaporins used in the production of salinity power.

Furthermore the present invention relates to the implementation of said membrane in a PRO system. FIG. 5 describes a PRO plant wherein fresh water as well as sea water is fed into separate water filters, prior to the streams are passing by one another on each side of a semi-permeable membrane, in this case the biomimetic water membranes comprising functional aquaporin channels. A portion of the mixture of permeate and salt water with elevated pressure is then passed to a turbine for the production of electric power. The balance of the permeate stream is passed to a pressure exchanger where incoming sea water is pressurized and fed into the membrane module.

In the present PRO plant pressure energy in the brackish water is directly hydraulic recovered for pressurizing incoming sea water. Thereby a part of the loss which ordinarily would occur in an ordinary water pump for this purpose is avoided. By avoiding this loss the PRO plant can be built on ground level instead of below ground level and nevertheless achieve acceptable efficiency.

Recovery of pressure energy by direct hydraulic pressurizing of incoming sea water takes place in a device where the turbine pressure in half of the device is pushing sea water directly into the membrane module. In the other half the brackish water is pushed back and out of the PRO plant as the sea water is pumped in. The mentioned processes which take place in the respective halves of the device for hydraulic pressurizing of sea water alternate by rotation of the water containing part or by a controlled valve system in the mentioned device.

Further info on PRO systems can be found in published international patent application no: WO 02/13955 which is incorporated by reference herein.

The present invention is not limited by this example of a PRO system, but relates to any biomimetic water membrane comprising aquaporins implemented in a PRO system and used in the production of salinity power.

Hence, the invention relates in a general aspect to a power plant utilising salinity power, said plant comprising
   at least one first and at least one second water reservoir, which are separated by a water membrane comprising functional aquaporin channels (e.g. a water membrane as disclosed herein); and
   at least one means for extracting energy from a hydrostatic pressure difference between the at least 2 reservoirs. This means for extracting energy is typically a turbine, a propeller, or any other device capable of converting hydrostatic/hydrodynamic energy into a convenient form of energy (electricity, heat, etc).

As discussed above, the power plant of the invention will utilise separate water inlets to the at least one first and at least second water reservoirs, and wherein the inlet to the at least one first reservoir provides water with a higher concentration of sodium chloride than the inlet to the at least one second water reservoir. It is convenient that the reservoir containing the water having high salt concentration (e.g. sea water) is capable of accommodating a significant amount of the water from the low salt water reservoir, in order for a substantial hydrostatic pressure to be established between the 2 reservoirs.

REFERENCES

Agre, P., M. Bonhivers, and M. J. Borgnia. (1998). The aquaporins, blueprints for cellular plumbing systems. Journal of Biolgical Chemistry, 273, 14659-14662.

Borgnia, M., S, Nielsen, A. Engel, and P. Agre. (1999). Cellular and molecular biology of the aquaporin water channels. Annual Review of Biochemistry, 68, 425-458.

A. A. Brian and H. M. McConnell. Allogenic stimulation of cytotoxic T cells by supported planar membranes. Proc. Natl. Acad. Sci. USA, 81:6159-6163, 1984.

Burykin and A. Warshel (2003). What really prevents proton transport through aquaporin? Charge self-energy vs. proton wire proposals, Biophysical Journal 85, 3696-3706.

Chakrabarti, N., Tajkhorshid, E., Roux, B. and Pommes, R. (2004). Molecular basis of proton blockage in aquaporins, Structure 12, 65-74.

de Groot, B. L., and Grubmuller, H. (2001). Water permeation across biological membranes: mechanism and dynamics of aquaporin-1 and GlpF, Science 294, 2353-2357.

de Groot, B. L., Frigato, T., Helms, V. and Grubmuller, H. (2003). The mechanism of proton exclusion in the aquaporin-1 channel, Journal of Molecular Biology 333, 279-293.

Fu, D., Libson, A., Miercke, L. J., Weitzman, C., Nollert, P., Krucinski, J., and Stroud, R. M. (2000). Structure of a glycerol-conducting channel and the basis for its selectivity, Science 290, 481-6.

Heymann, J. B. and Engel, A. (1999). Aquaporins: Phylogeny, Structure, and Physiology of Water Channels. News Physiol. Sci. (14) p. 188.

Ilan, B., Tajkhorshid, E., Schulten, K. and Voth, G. (2004). The mechanism of proton exclusion in aquaporin water channels. PROTEINS: Structure, Function, and Bioinformatics, 55, 223-228.

Jensen, M. O., Tajkhorshid, E., and Schulten, K. (2003). Electrostatic tuning of permeation and selectivity in aquaporin water channels, Biophysical Journal 85, 2884-2899.

Z. V. Leonenko, A. Carnini, and D. T. Cramb. Supported planar bilayer formation by vesicle fusion: the interaction of phospholipid vesicles with surfaces and the effect of gramicidin on bilayer properties using atomic force microscopy. Biochim. Biophys. Acta, 1509:131-147, 2000.

H. Lin, R. Bhatia, and R. Lal. Amyloid β protein forms ion channels: implications for Alzheimer's disease pathophysiology. FASEB J., 15:2433-2444, 2001.

Montal, M., and P. Mueller. Formation of bimolecular membranes from monolayers and study of their properties. Proc. Natl. Acad. Sci. USA. 69:3561-3566, 1972.

J. Mou, D. M. Czajkowsky, and Z. Shao. Gramicidin A aggregation in supported gel state phosphatidylcholine bilayers. Biochemistry, 35:3222-3226, 1996.

Mueller, D., Rudin, O., Tien, H. T. and W. C. Wescott. Reconstruction of cell membrane structure in virto and its transformation into an excitable system. Nature (Lond.) 194: 979-980, 1962.

Murata, K., Mitsuoka, K., Hirai, T., Walz, T., Agre, P., Heymann, J. B., Engel, A., and Fujiyoshi, Y. (2000). Structural determinants of water permeation through aquaporin-1, Nature 407, 599-605.

Preston, G. M., P. Piazza-Carroll, W. B. Guggino, and P. Agre. (1992). Appearance of water channels in *Xenopus* oocytes expressing red cell CHIP28 water channel. Science, 256, 385-387.

E. Reimhult, F. Hook, and B. Kasemo. Intact vesicle adsorption and supported biomembrane formation from vesicles in solution: Influence of surface chemistry, vesicle size, temperature, and osmotic pressure. Langmuir, 19:1681-1691, 2003.

Ren, G., Reddy, V. S., Cheng, A., Melnyk, P., and Mitra, A. K. (2001). Visualization of a water-selective pore by electron crystallography in vitreous ice, Proc Natl Acad Sci USA 98, 1398-1403.

I. Reviakine and A. Brisson. Formation of supported phospholipid bilayers from unilamellar vesicles investigated by atomic force microscopy. Langmuir, 16:1806-1815, 2000.

H. A. Rinia, R. A. Kik, R. A. Demel, M. M. E. Snel, J. A. Killian, J. P. J. M. van der Eerden, and B. de Kruijff. Visualization of highly ordered striated domains induced by transmembrane peptides in supported phosphatidylcholine bilayers. Biochemistry, 39:5852-5858, 2000.

A. C. Simonsen and L. A. Bagatolli. Structure of spin-coated lipid films and domain formation in supported membranes formed by hydration. Langmuir, 20:9720-9728, 2004.

Sui, H., Han, B. G., Lee, J. K., Walian, P., and Jap, B. K. (2001). Structural basis of water-specific transport through the AQP1 water channel, Nature 414, 872-8.

Tajkhorshid, E., Nollert, P., Jensen, M. O., Miercke, L. J., O'Connell, J., Stroud, R. M., and Schulten, K. (2002). Control of the selectivity of the aquaporin water channel family by global orientational tuning, Science 296, 525-530.

E. J. M. van Kan, D. N. Ganchev, M. M. E. Snel, V. Chupin, A. van der Bent, and B. de Kruijff. The peptide entibiotic clavanin A interacts strongly and specifically with lipid bilayers. Biochemistry, 42:11366-11372, 2003.

Zhu, F., Tajkhorshid, E. and Schulten, K. (2003). Theory and simulation of water permeation in aquaporin-1. Biophysical Journal, 86, 50-57.

Zeidel, Mark L., Suresh V. Ambudkar, Barbara L. Smith, and Peter Agre, Biochemistry 1992, 31, 7436-7440.

The invention claimed is:

1. A method for the production of salinity power using pressure retarded osmosis, said method comprising utilizing a biomimetic membrane comprising aquaporin water channels to increase hydrostatic pressure and using the increase in hydrostatic pressure as a source of salinity power.

2. The method according to claim 1, wherein the aquaporins are incorporated in a lipid bilayer membrane, in a block copolymer membrane, or in a lipid membrane consisting of multiple bilayers of fused deposited lipid vesicles.

3. The method according to claim 1 or 2, wherein the biomimetic membrane comprises a membrane film with hydrophobic surface properties and with multiple holes in the mm to µm range.

4. The method according to claim 1, wherein the aquaporin is of plant origin.

5. The method of claim 4, wherein the aquaporin of plant origin is a TIP, a PIP, or a NIP aquaporin, or a mixture or hybrid thereof.

6. A method for producing salinity energy using pressure retarded osmosis, comprising the steps of:
1) leading a first aqueous solution into at least one first vessel;
2) leading a second aqueous solution into at least one second vessel, said first aqueous solution having a higher concentration of sodium chloride than said second aqueous solution, and wherein said at least first and at least second vessels are mutually separated by a water-permeable wall comprising a biomimetic membrane comprising aquaporin water channels, whereby water moves from the at least one second vessel to the at least one first vessel so as to build up a positive hydrostatic pressure in the at least one first vessel relative to the at least one second vessel; and
3) utilizing said hydrostatic pressure as a source of energy.

7. The method according to claim 6, wherein utilization in step 3 is accomplished by leading water from the at least one first vessel via a turbine or an equivalent device.

8. The method of claim 6, wherein the aquaporins are incorporated in a lipid bilayer membrane, in a block copolymer membrane, or in a lipid membrane consisting of multiple bilayers of fused deposited lipid vesicles.

9. A power plant for producing salinity energy using pressure retarded osmosis comprising:
at least one first and at least one second water reservoir, which are separated by a biomimetic membrane comprising aquaporin water channels; and
at least one means for extracting energy from a hydrostatic pressure difference between the at least one first and at least one second reservoir.

10. The power plant according to claim 9, wherein the means for extracting energy is a turbine.

11. The power plant according to claim 9 or 10, which includes separate water inlets to the at least one first and at least one second water reservoirs, and wherein the inlet to the at least one first reservoir provides water with a higher concentration of sodium chloride than the inlet to the at least one second water reservoir.

12. The power plant according to claim 9, wherein the biomimetic membrane comprises aquaporins incorporated in a lipid bilayer membrane, in a block copolymer membrane, or in a lipid membrane consisting of multiple bilayers of fused deposited lipid vesicles, sandwiched around a membrane film with hydrophobic surface properties and with multiple holes in the mm to µm range.

* * * * *